(12) United States Patent
Mohan et al.

(10) Patent No.: US 7,676,661 B1
(45) Date of Patent: Mar. 9, 2010

(54) METHOD AND SYSTEM FOR FUNCTION ACCELERATION USING CUSTOM INSTRUCTIONS

(75) Inventors: Sundararajarao Mohan, Sunnyvale, CA (US); Satish R. Ganesan, Mountain View, CA (US); Goran Bilski, Molndal (SE)

(73) Assignee: Xilinx, Inc., San Jose, CA (US)

( * ) Notice: Subject to any disclaimer, the term of this patent is extended or adjusted under 35 U.S.C. 154(b) by 562 days.

(21) Appl. No.: 10/958,962

(22) Filed: Oct. 5, 2004

(51) Int. Cl.
G06F 7/36 (2006.01)
G06F 15/00 (2006.01)

(52) U.S. Cl. ............... 712/225; 712/15; 712/11; 716/16

(58) Field of Classification Search ........... 712/225, 712/11, 15
See application file for complete search history.

(56) References Cited

U.S. PATENT DOCUMENTS

| | | | |
|---|---|---|---|
| 4,914,653 A * | 4/1990 | Bishop et al. ............ 370/462 |
| 4,942,553 A | 7/1990 | Dalrymple et al. |
| 4,943,909 A * | 7/1990 | Huang ................. 712/15 |
| 4,949,909 A | 8/1990 | Hatfield |
| 5,426,756 A | 6/1995 | Shyi et al. |
| 5,600,845 A | 2/1997 | Gilson |
| 5,737,631 A | 4/1998 | Trimberger |
| 6,141,327 A * | 10/2000 | Kalkunte et al. ......... 370/252 |
| 6,181,159 B1 | 1/2001 | Rangasayee |
| 6,215,327 B1 * | 4/2001 | Lyke ................... 326/41 |
| 6,237,085 B1 | 5/2001 | Burns et al. |
| 6,240,471 B1 * | 5/2001 | Schlueter et al. ......... 710/62 |
| 6,389,490 B1 | 5/2002 | Camilleri et al. |
| 6,418,494 B1 | 7/2002 | Shatas et al. |
| 6,434,642 B1 | 8/2002 | Camilleri et al. |
| 6,484,280 B1 | 11/2002 | Moberly |
| 6,678,645 B1 | 1/2004 | Rajsuman et al. |
| 6,700,404 B1 | 3/2004 | Feng et al. |
| 6,751,723 B1 | 6/2004 | Kunda et al. |
| 6,838,902 B1 | 1/2005 | Elftmann et al. |
| 6,864,710 B1 | 3/2005 | Lacey et al. |
| 6,934,198 B1 | 8/2005 | Lowe et al. |

(Continued)

OTHER PUBLICATIONS

Application Note: MicroBlaze "Connecting Customized IP to the MicroBlaze Soft Processor Using the Fast Simplex Link (FSL) Channel" by Hans-Peter Rosinger, XAPP529 (v1.3) May 12, 2004. Pertinent pp. 1-12.*

(Continued)

*Primary Examiner*—Eddie P Chan
*Assistant Examiner*—Driss N Alrobaye
(74) *Attorney, Agent, or Firm*—Pablo Meles; LeRoy D. Maunu

(57) ABSTRACT

A fast linked multiprocessor network including a plurality of processing modules implemented on a field programmable gate array and a plurality of configurable uni-directional links coupled among at least two of the plurality processing modules provide a streaming communication channel between at least two of the plurality of processing modules. Such configuration provides a function accelerator that can feed at least one processor with data values using one custom instruction to put data values on at least one uni-directional serial link and that can extract data values from at least one processor using one custom instruction to get data values from the at least one uni-directional serial link.

5 Claims, 9 Drawing Sheets

U.S. PATENT DOCUMENTS

| | | | |
|---|---|---|---|
| 7,038,952 | B1 | 5/2006 | Zack et al. |
| 7,106,098 | B1 | 9/2006 | Zack et al. |
| 2002/0016869 | A1* | 2/2002 | Comeau et al. ............. 709/324 |
| 2002/0095649 | A1 | 7/2002 | Sample et al. |
| 2002/0124007 | A1 | 9/2002 | Zhao |
| 2003/0217306 | A1 | 11/2003 | Harthcock et al. |
| 2005/0256969 | A1* | 11/2005 | Yancey et al. ............... 709/238 |

OTHER PUBLICATIONS

Application Note: MicroBlaze "Connecting Customized IP to the MicroBlaze Soft Processor Using the Fast Simplex Link (FSL) Channel" by Hans-Peter Rosinger, XAPP529 (v1.3) May 12, 2004. Pertinent pp. 1-12.*

"Wikipedia" terms to search: unix pipe.*

"Webopedia" terms to search: simplex.*

U.S. Appl. No. 10/229,543, filed Aug. 27, 2002, Ganesan et al.

U.S. Appl. No. 10/295,687, filed Nov. 15, 2002, Ganesan et al.

U.S. Appl. No. 10/377,855, filed Feb. 28, 2003, Bilski.

Xilinx, Inc.; "MicroBlaze Hardware Reference Guide"; Mar. 2002; available from Xilinx, Inc., 2100 Logic Drive, San Jose, California 95124; pp. 1-20.

SGS-Thomson; "32-bit floating-point transputer", IMS T805; Feb. 1996; available from SGS-Thomson Microelectronics; pp. 1-71.

http://www.wizzy.com/wizzy/transputer_faq.txt; "The Transputer FAQ"; downloaded Jan. 14, 2003; pp. 1-13.

Hennessy, John L. et al., "Computer Organization and Design; The Hardware / Software Interface", 2nd Edition, pp. 346 & 499, available from Morgan kauffmann Publishers, Inc., San Francisco, CA, Aug. 1, 1997.

* cited by examiner

METHOD AND SYSTEM FOR FUNCTION ACCELERATION USING CUSTOM INSTRUCTIONS

FIELD OF THE INVENTION

This invention relates generally to programmable logic devices, and more particularly to a method and system for implementing function acceleration using custom instructions.

BACKGROUND OF THE INVENTION

Programmable devices are a class of general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays (FPGA).

As chip capacity continues to increase significantly, the use of field programmable gate arrays (FPGAs) is quickly replacing the use of application specific integrated circuits (ASICs). An ASIC is a specialized integrated circuit that is designed for a particular application and can be implemented as a specialized microprocessor. Notably, FPGAs can be designed using a variety of architectures that can include user configurable input/output blocks (IOBs), and programmable logic blocks having configurable interconnects and switching capability.

The advancement of computer chip technology has also resulted in the development of embedded processors and controllers. An embedded processor or controller can be a microprocessor or microcontroller circuitry that has been integrated into an electronic device as opposed to being built as a standalone module or "plugin card." Advancement of FPGA technology has led to the development of FPGA-based system-on-chips (SoC) including FPGA-based embedded processor SoCs. An SoC is a fully functional product having its electronic circuitry contained on a single chip. While a microprocessor chip requires ancillary hardware electronic components to process instructions, an SoC would include all required ancillary electronics. For example, an SoC for a cellular telephone can include a microprocessor, encoder, decoder, digital signal processor (DSP), RAM and ROM. It should be understood within contemplation of the present invention that an FPGA-Based SoC does not necessarily include a microprocessor or microcontroller. For example, an SoC for a cellular telephone could include an encoder, decoder, digital signal processor (DSP), RAM and ROM that rely on an external microprocessor. An SoC could also include multiple processing modules coupled to each other via a bus or several busses. It should also be understood herein that "FPGA-based embedded processor SoCs" are a specific subset of FPGA-based SoCs that would include their own processors.

In order for FPGA users to develop FPGA-based SoCs or FPGA-based embedded processor SoCs, it is necessary for them to acquire intellectual property rights for system components and/or related technologies that are utilized to create the FPGA-based SoCs. These system components and/or technologies are called cores or Intellectual Property (IP) cores. An electronic file containing system component information can typically be used to represent the core. More generically, the IP cores can form one or more of the processing modules in an FPGA-based SoCs. The processing modules can either be hardware or software based.

Notwithstanding advantages provided by using FPGA-based SoCs, the development of these SoCs can be very challenging. One of the challenges includes communication among multiple hardware and software processors embedded in a FPGA-based SoC. Typically, such communication occurs over a bus. Unfortunately, communication over a bus involves a large amount of overhead due to bus arbitration times. Therefore, several clock cycles are typically needed for simple communication among processing modules.

Microprocessors typically have fixed instruction sets. Even though microprocessor vendors have usually provided a means to extend the instruction set through the use of accelerators or co-processors, such additional custom instructions are extremely limited due to the capabilities of the processors. Typically, users are allowed to add one or more instructions to perform some operation that is critical to their specific application, such as multiply-and-add or multiply-and-accumulate instructions operating on 1-3 pieces of data. Custom instructions of this form can slow down or stall the processor if they cannot perform their computation within a single clock cycle for the processor. In practice, this limits the complexity of the custom instruction due to the processor clock speed. Thus, there fails to exist not only a method and system for enabling fast linked processing modules with programmable links, but a method and system that can perform multiple custom operations within a single clock cycle on a processor.

SUMMARY OF THE INVENTION

In a first embodiment of the present invention, a method of accelerating functions for a processor comprises the steps of feeding a plurality of inputs into the processor via an accelerator module via at least one configurable uni-directional serial link formed from a first-in-first-out (FIFO) streaming communication network using at least one custom instruction to put data values on the at least one configurable uni-directional serial link and extracting a plurality of outputs from the processor via the accelerator module via at least one configurable uni-directional serial link formed from a first-in-first-out (FIFO) streaming communication network using one or more custom instructions to get data values from the at least one configurable uni-directional serial link. The processor and optionally additional processors can be implemented on a field programmable gate array and a plurality of configurable uni-directional links can be coupled among the processor and the accelerator module.

The plurality of uni-directional links can be formed from a FIFO streaming communication network and can also be ideally formed using the reconfigurable fabric of the FPGA to enable uni-directional links that are configurable in terms of depth in buffer (FIFO) size and width in bit size. The processor or processors can be soft or hard processor types and could serve as digital signal processors or network processor cores for example. The fast linked multiprocessor network can also comprise a plurality of uni-directional links for providing a streaming communication channel between processors and a System on Chip communication bus.

The method can further include the step of starting the computation of a function as soon as a first input is received by the at least one configurable uni-directional serial link or alternatively starting the computation of a function when all inputs are available from the at least one configurable uni-directional serial link. Note that the step of feeding can be done by using one custom instruction to put data values on the at least one configurable uni-directional serial link and the step of extracting can be done using one custom instruction to get data values from the at least one configurable uni-directional serial link. The feeding and extracting steps can occur within a single clock cycle of the processor. Also note that at least one or more parallel sequences of input values can be fed and that one or more parallel sequences of outputs can be extracted. The method can further include the step of selecting among a blocking and a non-blocking put or get function using additional custom instructions.

In accordance with a second embodiment of the present invention, a function accelerator used in conjunction with at least one processor can include a plurality of configurable uni-directional links serving as inputs to the function accelerator providing a streaming communication channel between the function accelerator and the at least one processor and a plurality of configurable uni-directional links serving as outputs to the function accelerator providing another streaming communication channel between the function accelerator and the at least one processor. The processor can be implemented on a field programmable gate array and the plurality of configurable uni-directional links can be formed from fast simplex links between the processor and the function accelerator. In other words, the plurality of uni-directional links can be formed from a first-in-first-out streaming communication network. Note that the plurality of uni-directional links can be formed using a reconfigurable fabric of a field programmable gate array and can be configurable in terms of depth in buffer size and width in bit size. Note that the processor can be a processing module such as a hardware processor, a software processor, a digital signal processor, or a network processor core. If multiple processing modules are used in a particular embodiment, then communication between any connected processing modules among the processor and the function accelerator or any other processor implemented on a System on Chip can occur in a single clock cycle. The function accelerator can further include a plurality of uni-directional links for providing a streaming communication channel between at least one of a plurality of processing modules and a system on chip communication bus. The function accelerator can also feed the at least one processor with data values using one custom instruction to put data values on the at least one uni-directional serial link among the plurality of uni-directional links. Likewise the function accelerator can extract data values from the at least one processor using one custom instruction to get data values from the at least one uni-directional serial link among the plurality of uni-directional links.

DETAILED DESCRIPTION OF THE DRAWINGS

Figure 1:
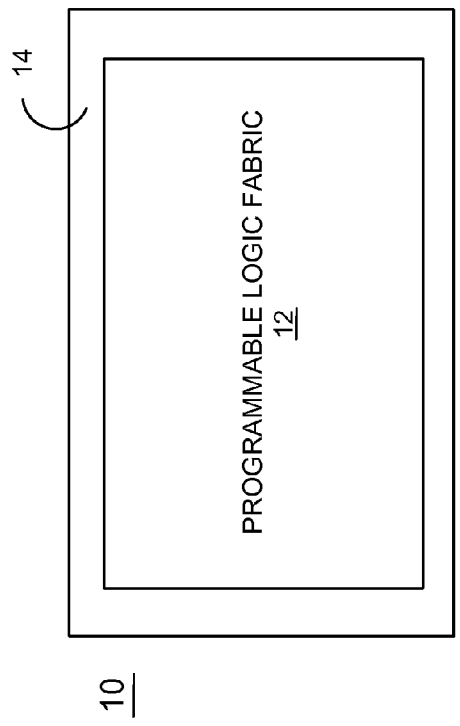
FIG. 1 illustrates a schematic block diagram of a prior art field programmable gate array.

Field programmable gate arrays (FPGA) have become very popular for telecommunication applications, Internet applications, switching applications, routing applications, and a variety of other end user applications. FIG. 1 illustrates a generic schematic block diagram of a field programmable gate array (FPGA) 10. The FPGA 10 includes programmable logic fabric 12 (containing programmable logic gates and programmable interconnects) and programmable input/output blocks 14. The programmable input/output blocks 14 are fabricated on a substrate supporting the FPGA 10 and are coupled to the pins of the integrated circuit, allowing users to access the programmable logic fabric 12. The programmable logic fabric 12 may be programmed to perform a wide variety of functions corresponding to particular end user applications and may be implemented in a variety of ways.

A fast simplex link (FSL) or programmable uni-directional link among processing modules can be implemented using the reconfigurable programmability of the FPGA and the FPGA fabric by allowing different data sizes and FIFO sizes or buffer sizes while still enabling a single clock delay between processing modules for communication. This programmability of the links allows greater flexibility during implementation. The FSL can be used as the communication interface between any two processing modules independent of processing module types (hardware or software). The FSLs also support additional flags, like full, empty, half-full etc. that may be used by the modules connected to the FSL. The processing module independence and the programmability greatly simplifies design paradigms like Co-design, or Multi-processing by standardizing the interface mechanism across hardware and software processors. It is possible to feed one or more parallel sequences of input values to the function hardware and compute one or more parallel sequences of outputs for communication or other streaming applications, resulting in one or more orders of magnitude improvement in processing speed over simple custom instructions.

Figure 2:
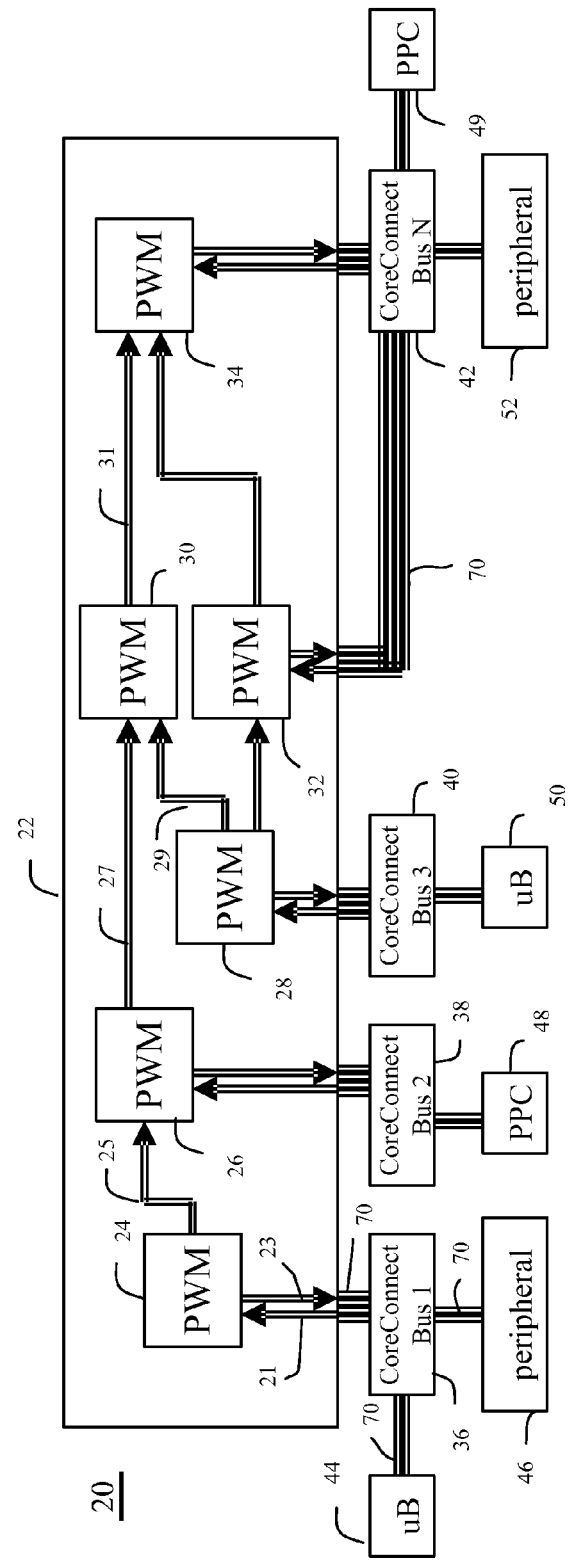
FIG. 2 depicts an exemplary block diagram of a System on Chip utilizing configurable uni-directional links in accordance with an example of the inventive arrangements.

Referring to FIG. 2, a fast linked multiprocessor network 20 preferably comprises a plurality of processing modules (24, 26, 28, 30, 32, and 34) implemented on a field programmable gate array and a plurality of configurable uni-directional links (21, 23, 25, 27, 29, 31) such as fast simplex links coupled among at least two of the plurality processing modules providing a streaming communication channel between at least two of the plurality of processing modules. The plurality of uni-directional links can be formed from a first-in-first-out (FIFO) streaming communication network and can also be ideally formed using the reconfigurable fabric of the field programmable gate array to enable uni-directional links that are configurable in terms of depth in buffer (FIFO) size and width in bit size. The processing modules can be software or hardware processor types and could serve as digital signal processors or network processor cores for example. The fast linked multiprocessor network can also comprise a plurality of uni-directional links for providing a streaming communication channel between at least one of the plurality of processing modules and a System on Chip communication bus such as IBM's CoreConnect bus.

Figure 3:
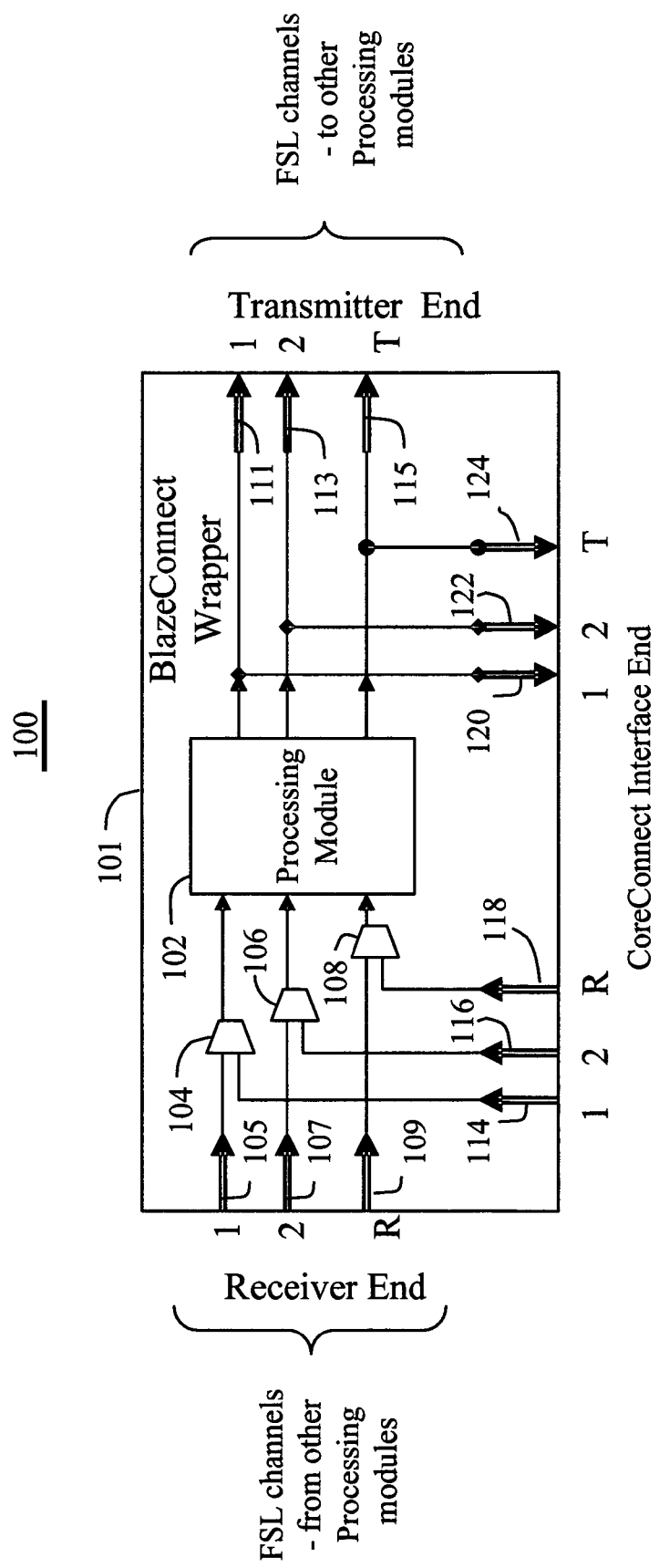
FIG. 3 depicts a block diagram of a processing module interface in accordance with an embodiment of the invention.

Referring to FIGS. 2 and 3, the system architecture in accordance with an embodiment of the present invention can include a central programmable connection matrix 22 or 100 and a set of one or more peripherals connected to it. FIG. 3 illustrates a programmable connection matrix 100 and in further detail a processing module interface or wrapper 101 used to connect one processing module such as processing module 102 to another processing module or one processing module to a bus. In the embodiment of FIG. 2, the matrix 22 can comprise of two types of communication channels. The first communication channel type is a dedicated Fast Simplex Link (FSL) that enables a fast dedicated communication channel between any two processing modules. For example, FSLs 25, 27, 29 and 31 respectively link processing modules 24 & 26, 26 & 30, 28 & 30, and 30 & 34. The FSL allows a processing module to transmit data in one clock cycle and the connected processing module to receive data in the following clock cycle. The FSL channel is uni-directional and dedicated and implements a Data Flow Channel between the connected modules. (Note that this Data Flow channel allows pipelining across serially connected processing modules). The FSL is also used to send control signals to the processing modules.

The second communication channel type is an FSL Interface channel that enables communication between a processing module and other modules/peripherals through other buses, like the IBM's CoreConnect Bus Architecture including the Processor Local Bus (PLB), On-Chip Peripheral Bus (OPB), or Device Control Register (DCR) for example. The CoreConnect Bus is a fully arbitrated bus shared amongst multiple peripherals. In FIG. 2, for example, CoreConnect bus (1) 36 enables communication between processing module 24 and peripherals 44 and 46, CoreConnect bus (2) 38 enables communication between processing module 26 and peripheral 48, CoreConnect bus (3) 40 enables communication between processing module 28 and peripheral 50, and CoreConnect bus (N) 42 enables communication between processing modules 32 and 34 and peripherals 49 and 52. All processing modules may be configured as slaves or masters on the bus. This allows processors like the IBM PowerPC 49 or 48) or Xilinx's MicroBlaze (44 or 50) that may be masters on the CoreConnect bus, to communicate with the processing modules (24, 26, 28, 30, 32, and 34). This also allows processing modules configured as masters to access any other slave peripherals connected to the CoreConnect bus.

Each of the processing modules in FIG. 2 (24, 26, 28, 30, 32, and 34) preferably uses a programmable connection matrix wrapper 101 as shown in FIG. 3 to connect to other processing modules and to buses. An interface for integrating processing modules in an FPGA-based SoC as shown in FIG. 3 comprises a plurality of configurable uni-directional serial links coupled to a plurality of input ports of a processing module where a first portion of the plurality of configurable uni-directional serial links are from at least another processing module and a second portion of the configurable plurality of uni-directional serial links are from a bus connection. The interface further comprises a plurality of configurable uni-directional serial links coupled to a plurality of output ports of the processing module, where a first portion of the plurality of configurable uni-direction serial links are coupling to at least another processing module and a second portion of the plurality of configurable uni-directional serial links are coupling to a bus connection.

Ideally, the uni-directional links are formed from a first-in-first-out streaming communication network using the reconfigurable fabric of the field programmable gate array and are configurable in terms of depth in buffer size and width in bit size. Communication between the processing module and another processing module can occur in a single clock cycle. The plurality of configurable uni-directional links provides a streaming communication channel between at least the processing module and another processing module or between the processing module and a communication bus. A plurality of multiplexers selectively connects the first portion and the second portion of the plurality of configurable uni-directional simplex links to the plurality of input ports of the processing module.

Ideally, only processing modules having the matrix wrapper 101 can use the FSL channel for communication to other processing modules. The matrix wrapper 101 can comprise [0:R] dedicated FSL channels using inbound FSL links 105, 107 and 109 on the receiving side of a processing module 102, and [0:T] dedicated FSL channels using outbound FSL links 111, 113, and 115 on the transmitting side of the processing module 102. The matrix wrapper 101 can further provide communication between a processing module and any other peripheral (having a matrix wrapper or not) through the CoreConnect bus (or other bus) using [0:R] FSL input interface channels to the CoreConnect bus using inbound FSL links 114, 116, and 118 or [0:T] FSL output interface channels to the CoreConnect bus using outbound FSL links 111, 113, and 115. The FSL links may interface to the CoreConnect bus using the IPIF (IP interface) 70 shown in FIG. 2. The IPIF currently supports communication either with the OPB bus or the PLB bus. The processing module 102 by itself preferably consists of [0:R] input data streams and [0:T] output data streams. The module's input data streams may be selectively connected using switches or multiplexers 104, 106 and 108 to either the receiver FSL channels or through the receiver FSL interface to the CoreConnect bus. Similarly, the module's output data streams may be connected either to the transmitter FSL channels or to the transmitter FSL interface to the CoreConnect bus. Further details are disclosed in co-pending U.S. patent application Ser. No. 10/229,543, entitled "Method and System for Fast Linked Processor in a System On Chip (SOC)" by Satish R. Ganesan et al., filed Aug. 27, 2002, which is herein incorporated by reference.

One of the advantages of a system built in accordance with an embodiment of the present invention is the ability of a bus master (PPC or MicroBlaze, for example) to perform useful computation in parallel while multiple processing modules communicating through FSL channels are active. Also, several FSL chains can perform computation in parallel along with the bus masters. Additionally, by providing the flexibility to use CoreConnect as a communication channel, embodiments in accordance with the present invention offer all the advantages of a system built purely with a CoreConnect bus. Also, the availability of the CoreConnect bus allows easy integration of sub-systems built using just the CoreConnect bus, along with sub-systems built using the present invention. The matrix wrapper enables processing modules to connect to one or more FSL channels and the CoreConnect bus. This model simplifies co-design by enabling implementation of modules in software or hardware by the turn of a switch. The FSL channel implements a dedicated data flow channel, thereby providing a "single clock delay" communication between any two data-dependent processing modules. Without the FSL communication channel, the data has to be communicated using the CoreConnect bus or other bus that consumes several clock cycles.

The code necessary for implementing the design of the FPGA-based SoC can be in a format such as the well known hardware description language (HDL) (NOTE: SoC designs are coded in C. The Hardware is represented in HDL and the software portion in C). HDL is a language used to describe the functions of an electronic circuit for documentation, simulation and/or logic synthesis. Verilog and VHSIC Hardware Description Language (VHDL) are standardized HDLs which are well known by those skilled in the art. Verilog and VHDL can be used to design electronic systems at the component, board and system level. They can facilitate the development of models at a very high level of abstraction. Other formats now known or to be discovered can also be used to represent the system model.

Although custom instructions cause processors in existing processor architectures to slow down or stall because of their inability to handle such instructions in a single clock cycle, embodiments in accordance with the present invention overcomes this limitation by implementing an entire sequence of simple instructions in special purpose hardware. The inputs to the function are fed into the hardware through special FIFO links to a processor using FIFO links (as described above) using a custom "put" instruction. Depending on the nature of the function, computation can start as soon as the first input is provided to the hardware module, or computation can start once all the inputs are available. The outputs of the function hardware can be retrieved by the processor using additional FIFO links using the custom "get" instruction. Further details on the get and put instructions are found in co-pending U.S. patent application Ser. No. 10/377,855, entitled "Native Support in Processor for Point-to-Point Communications", by Goran Bilski, filed Feb. 28, 2003, which is herein incorporated by reference. Any number of outputs may be provided by the function. It is possible to feed one or more parallel sequences of input values to the function hardware and compute one or more parallel sequences of outputs for communication or other streaming applications, resulting in one or more orders of magnitude improvement in processing speed over simple custom instructions.

The details of a function acceleration mechanism as it applies to a soft processor such as Xilinx's MicroBlaze processor can be found in Xilinx's co-pending U.S. patent application Ser. No. 10/295,687, entitled "Method and System for Designing a Multiprocessor" by Satish R. Ganesan, et al., filed Nov. 15, 2002, which is herein incorporated by reference.

This same mechanism can be applied to hardware processors such as the PowerPC by adding appropriate FIFO links and custom get and put instructions. Even existing processors with existing custom instruction capabilities can benefit by the function acceleration techniques and hardware herein by adding the appropriate FIFO link hardware for input and output and using one custom instruction to put data values on a FIFO link and using one custom instruction to get data values from a FIFO link. The function accelerator hardware can be coupled to the input and output FIFO links and additional input and output FIFO links can be added as needed. Additional custom instructions can be implemented to provide a choice of blocking or non-blocking gets and puts if desired and for implementing control instructions similar to the get and put family of instructions used with the MicroBlaze soft processor. User functions can also be accelerated using the software schemes described in U.S. patent application Ser. No. 10/295,687, entitled "Method and System for Designing a Multiprocessor" by Satish R. Ganesan, et al., filed Nov. 15, 2002.

Figure 4:
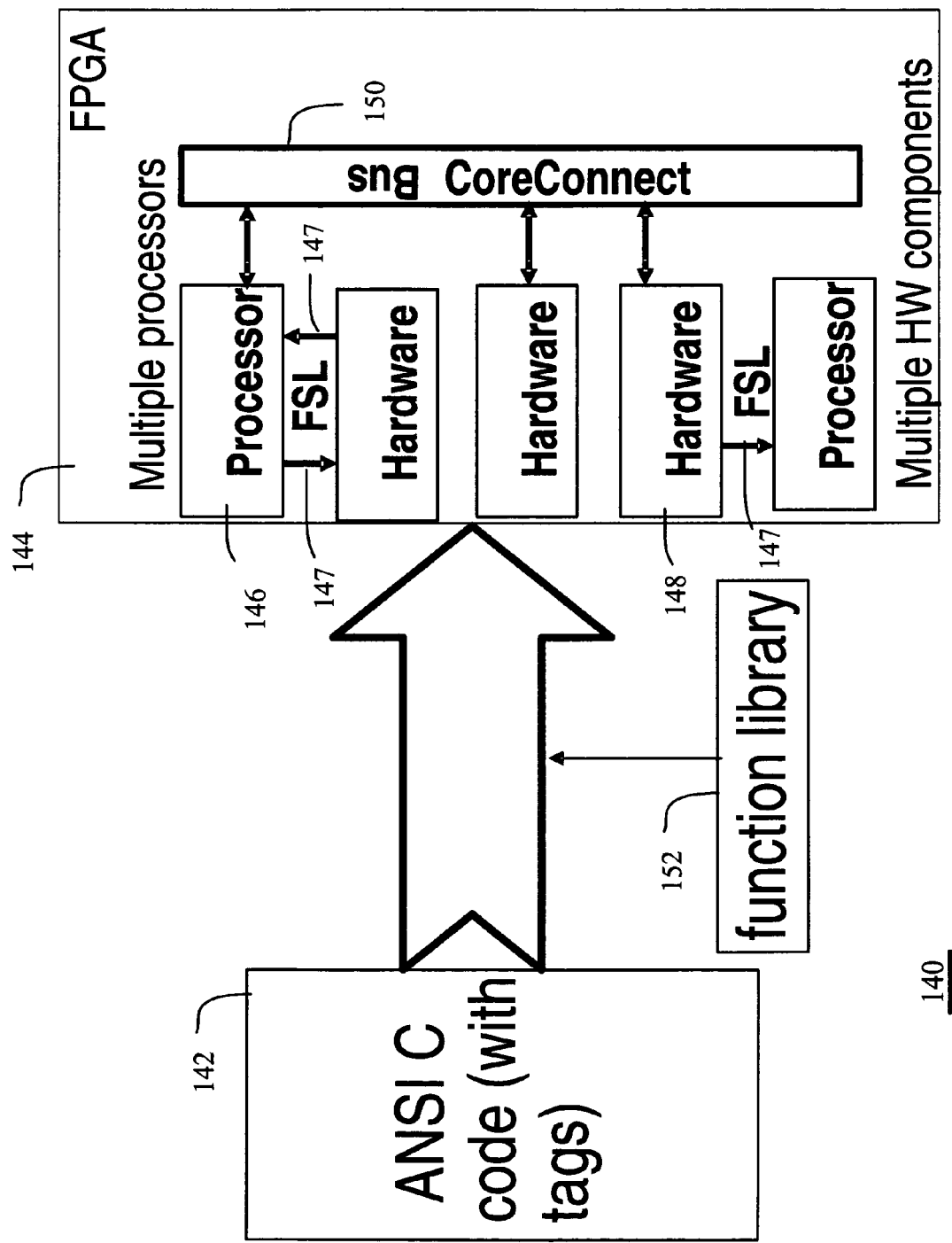
FIG. 4 depicts an exemplary block diagram of a multiprocessor system using C code with tags in accordance with an embodiment of the present invention.

More particularly, referring to FIG. 4, an exemplary block diagram of a multiprocessor system 140 using C code with tags in accordance with an embodiment of the present invention illustrates the various aspects of a co-design system. In each instance as will be shown in further detail in FIGS. 5-8, all the source code 142 can be written in a single programming language with tags. Preferably, the source code 142 is written in ANSI C, although the present invention is not limited thereto. In this manner, a designer does not need to learn a new language when modifying or specifying a design with software processors, hardware processors, and the connectivity between such processors. Referring to FIG. 3, the system 140 preferably utilizes a function library 152 that contains both hardware and software components called by the code with tags (142) when converted to a target implementation in the form of an FPGA 144. For example, the library can contain a design for "xil_idct1d" which contains the software and hardware implementations of a one dimension inverse discrete cosine transformation function on a 8×8 matrix. Likewise, "xil_matrix_transpose" can contain software and hardware implementations of a matrix transpose function for a 8×8 matrix. The co-design multiprocessor system 140 preferably comprises at least two processors such as a software processor 146 and a hardware processor 148 specified by c code with tags. The C code with tags may also specify the connectivity between the processors, for example using a fast simplex link (147) or a bus structure such as IBM's CoreConnect Bus 150.

A fast simplex link (FSL) or programmable uni-directional link among processing modules can be implemented using the reconfigurable programmability of the FPGA and the FPGA fabric by allowing different data sizes and FIFO sizes or buffer sizes while still enabling a single clock delay between processing modules for communication. FSL utilizes FIFOs for buffering and for synchronization between communicating processors. This programmability of the links allows greater flexibility during implementation and provides a fast point to point connection. The FSL can be used as the communication interface between any two processing modules independent of processing module types (hardware or software). FSL read and write instructions are currently available on Xilinx's MicroBlaze software processor. The processing module independence and the programmability greatly simplifies design paradigms like Co-design, or Multi-processing by standardizing the interface mechanism across hardware and software processors.

Figure 5:
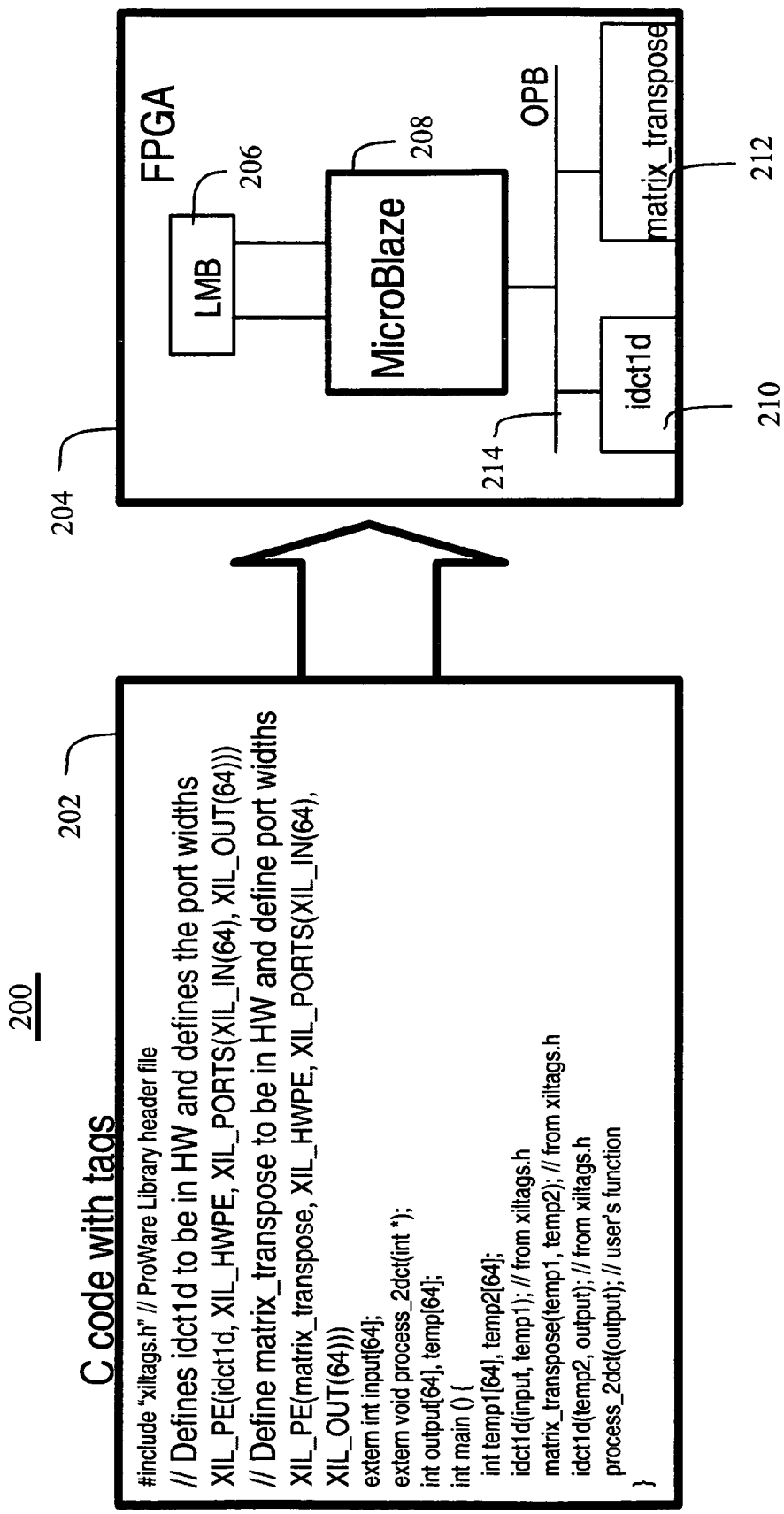
FIG. 5 is a more detailed block diagram of a multiprocessor system using C code with tags and a bus structure in accordance with an embodiment of the present invention.
Figure 6:
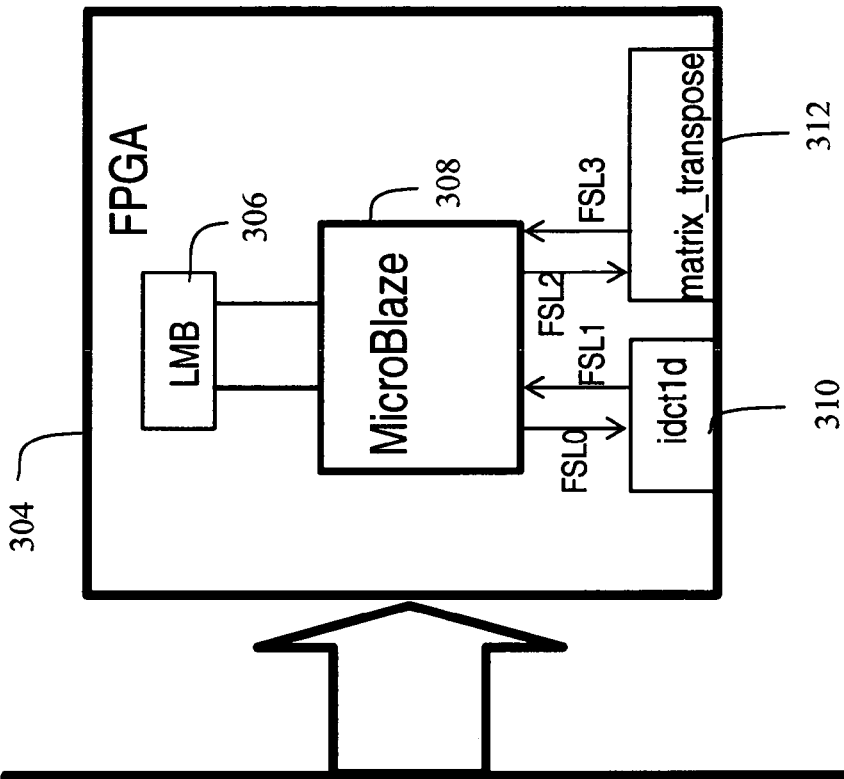
FIG. 6 is a more detailed block diagram of a multiprocessor system using C code with tags and uni-directional links in accordance with an embodiment of the present invention.

Referring to FIG. 5, a multiprocessor system 200 illustrates how a system can be specified using a CoreConnect Bus 214 using C code with tags in source code 202 for connectivity between processors. The tags can be macros that compile with no side effects on any ANSI C compiler. An FPGA 204 is implemented in this instance with a single software processor 208, a local memory bus (LMB) 206 and several hardware processors 210 and 212. Hardware processor 210 can perform the function of idct1d and hardware processor 212 can perform the function of matrix_transponse. Calls to idct1d and matrix_transpose become calls to driver code that writes parameters to hardware and reads results from hardware. The CoreConnect bus 214 can be implemented using an On-Chip Peripheral Bus (OPB) as shown or a Processor Local Bus (PLB). As with the FSL, the CoreConnect bus can use FIFOs for buffering and synchronization as needed. Similarly shown in FIG. 6, is a multiprocessor system 300 using alternate FSL connectivity in an FPGA 304. Changing connectivity from OPB to FSL can be done by adding or modifying tags. The system 300 includes a software processor 308, a local memory bus (LMB) 306 and several hardware processors 310 and 312 using FSL connectivity as specified by source code 300 preferably using C code with tags as shown. More specifically, the idct1d processor 310 has its ports mapped to FSL0 for inputs and FSL1 for outputs. Likewise, the matrix_transpose processor 312 has its ports mapped to FSL2 for inputs and FSL3 for outputs. Note that the system 300 includes multiple FSLs being read and written in parallel using custom instructions such as the custom put and get instructions. Further note that hardware calls can be blocking or non-blocking. Blocking calls require the software processor to wait until results are available back from the hardware. Non-blocking calls on the other hand, allows the software processor to perform useful computation while the hardware processor is still computing its results.

Figure 7:
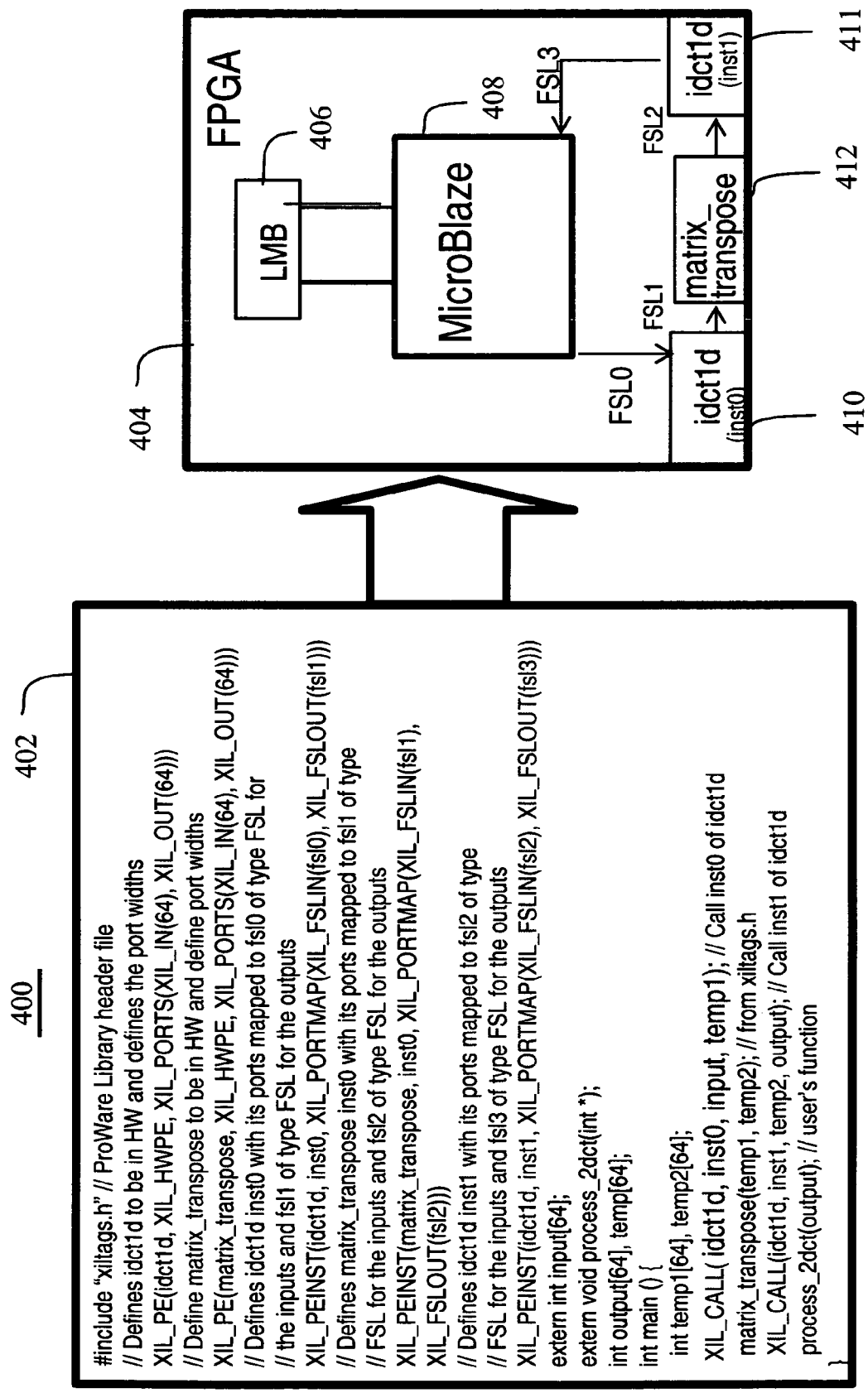
FIG. 7 is a more detailed block diagram of a multiprocessor system using C code with tags and the ability to define multiple hardware instances in accordance with an embodiment of the present invention.

Referring to FIG. 7, another multiprocessor system 400 is shown similar to the system 300 of FIG. 6 except that the source code preferably includes C code and tags that specify multiple structural instances of the same hardware function, namely hardware processor 410 and hardware processor 411 for idct1d (instance 0) and idct1d (instance 1) respectively. As in system 300, the system 400 includes source code 402, LMB 406, software processor 408, hardware processors 410, 411, and 412 as well as the FSL connectivity between processors as specified by the source code 402 as shown. A PORTMAP name mapping can be used to define pipelining between the processors in such configuration.

Figure 8:
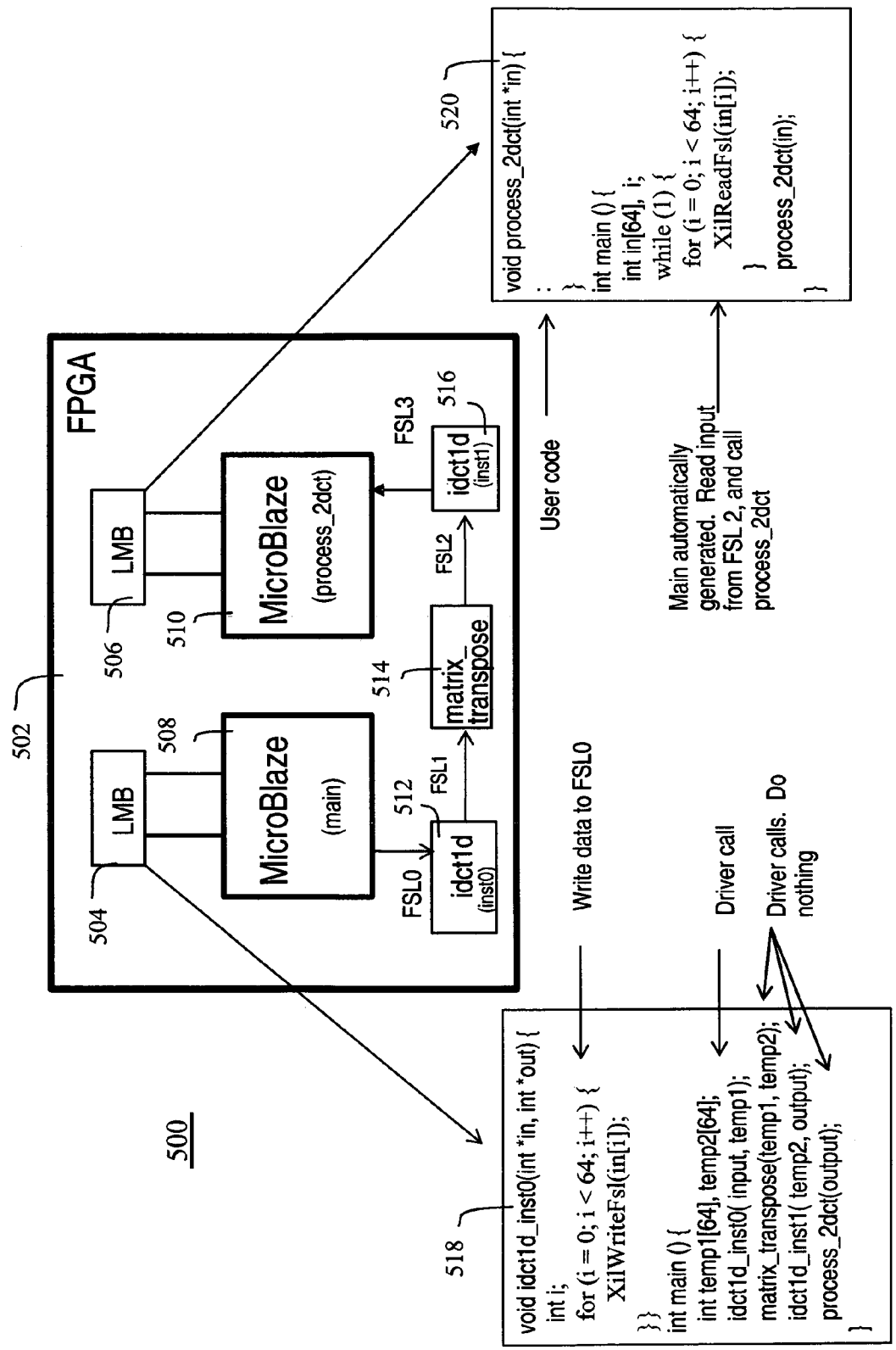
FIG. 8 illustrates the use of C code with tags to define multiple hardware and software processors in accordance with an embodiment of the present invention.

Referring to FIG. 8, yet another multiprocessor system 500 is shown illustrating the tremendous flexibility and variability of an embodiment of the present invention implemented in an FPGA 502. System 500 can include at least two software processors 508 and 510 as specified by source code preferably having C code with tags. The tags may also specify the connectivity between processors, other processors (hardware or software), as well as multiple structural instances. More specifically, system 500 illustrates this by including software processors 508 and 510, hardware processors 512 and 514 as well as the multiple instance of processor 512 by the presence of hardware processor 516 and the connectivity between all the processors in the form of FSL links. The system also includes LMB 504 and 506 that may contain the instruction and data (518 and 520) for the processors.

Figure 9:
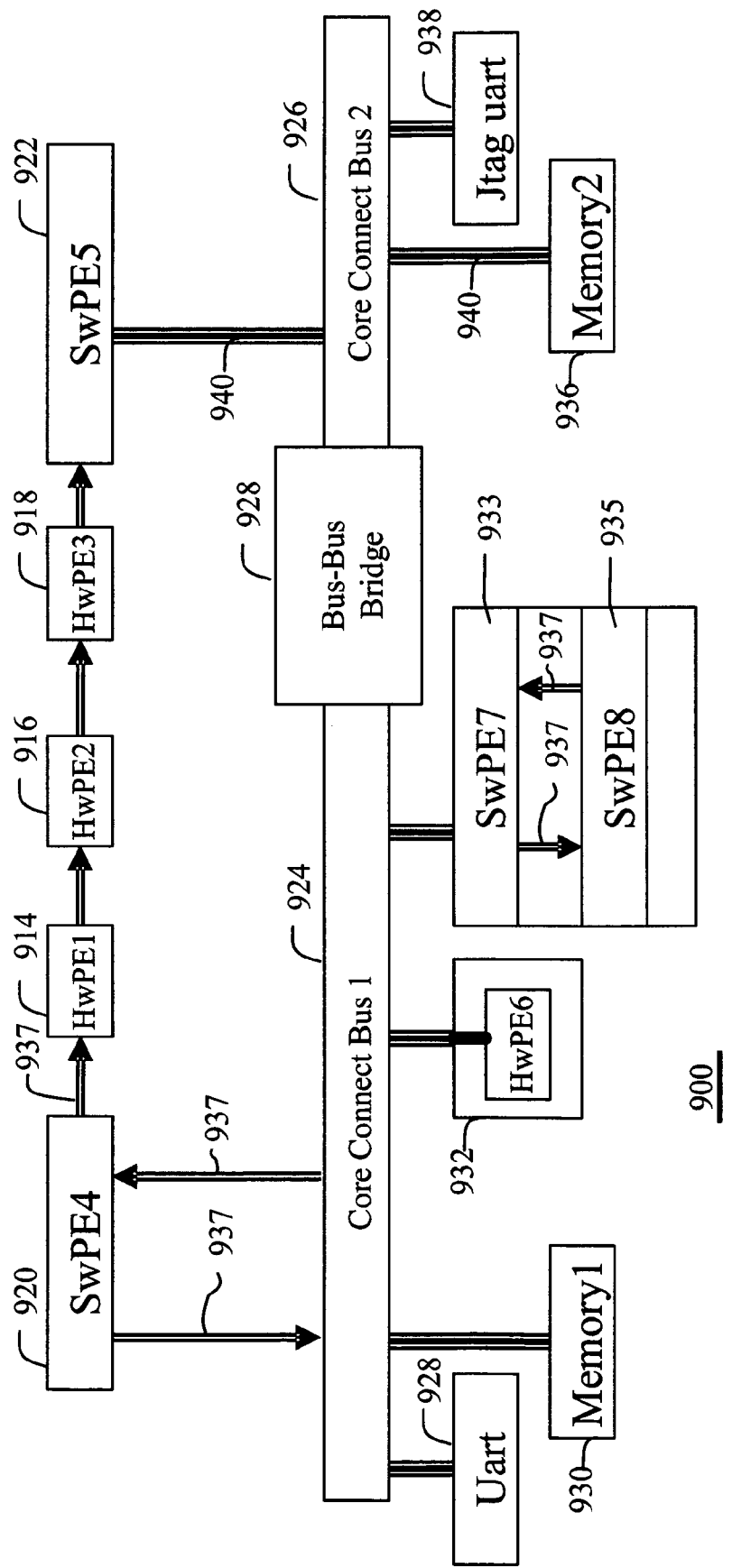
FIG. 9 depicts an exemplary block diagram of a multiprocessor system using configurable uni-directional links and buses in accordance with an embodiment of the present invention.

Another illustrative multiprocessor system 900 shown in FIG. 9 preferably comprises a plurality of processing modules or engines including software processing engines 920, 922, 933, and 935 as well as hardware processing engines 914, 916, 918, and 932 implemented on a field programmable gate array. The multiprocessor system 900 can further comprise a plurality of configurable uni-directional links 937 such as fast simplex links (FSL) coupled among at least two of the plurality processing modules providing a streaming communication channel between at least two of the plurality of processing modules. The plurality of uni-directional links can be formed from a first-in-first-out (FIFO) streaming communication network and can also be ideally formed using the reconfigurable fabric of the field programmable field array to enable uni-directional links that are configurable in terms of depth in buffer (FIFO) size and width in bit size. For example processing engines 920, 914, 916, 918 and 922 are connected in a chain using these uni-directional links. Likewise, software processing engines 933 and 935 can each be wrapped in an interface connected by another chain of uni-directional links 937. The multiprocessor system 10 can also comprise one or more buses 924 and 926 such as IBM's CoreConnect bus linking the plurality of processing engines as well as other components such as UART 928, memory 930, memory 936, and JTAG UART 938. Multiple buses (924 and 926) can be connected via Bus-to-Bus bridges such as bridge 928. Connections 940 between the buses and the processing engines or buses and other components can utilize an interface to the CoreConnect bus using an FSL 937 or a link 940 such as the IPIF (IP interface) or other similar interface as shown in FIG. 9. The IPIF currently supports communication either with the OPB bus or the PLB bus of the CoreConnect bus.

FIG. 9 also represents the structural view of a dedicated distributed multiprocessor system. As explained above, the system consists of a set of one or more processing engines (PE) communicating through buses and interfaces such as the CoreConnect Bus or using the FSL links. The processing engines (PE) shown can be a Software-driven Processing Engine (SwPE) which can consist of a central microprocessor that performs a computation. This microprocessor may off-load some if it's functions to other processing engines. For example, this microprocessor can be an IBM PowerPC or a Xilinx MicroBlaze soft processor, although the present invention is not limited thereto. The PE can also be a Hardware Processing Engine (HwPE). In this case, the entire computation is performed in hardware. Each hardware PE should preferably comprise of a C code that can be implemented in software and an HDL implementation of the hardware. Every PE preferably contains one or more interfaces to either a FSL or a bus of the CoreConnect bus on both the input and output side.

Communication between any two processing engines is achieved in one of the following ways:

Direct Data Flow: The processing engines in this case are connected by the FSL bus. In FIG. 9, this is represented by the connection 937 between SwPE7 (933) and SwPE8 (935) or the connection between the HwPE1 (914) and HwPE2 (916).

Single Bus with Shared Memory: In this configuration, the processing engines (920 and 933) are connected as masters to the CoreConnect bus. All accesses to shared data are arbited by the bus. Control signals, if any, required to determine the order of such shared memory data accesses is also communicated via the shared memory. In FIG. 9, this is represented by the elements SwPE4 (920), SwPE7 (933) and Memory1 (930) connected by CoreConnect bus 1 (924).

Multiple Buses with Shared Memory: In this configuration, each processing engine has it's own bus and memory. The two buses 924 and 926 are connected via a bus-to-bus bridge 928. Data is transferred from one processor to the other using this bridge. This is represented by the elements SwPE7 (933), SwPE5 (922) and Memory2 (936). SwPE7 (933) is connected to Memory 2 (936) using the bus-to-bus bridge 928 between CoreConnect Buses 924 and 926.

The multiprocessor system 900 as shown in FIG. 9 preferably has a plurality of processing engines on a field programmable gate array based System-on-Chip including a structure of at least two processing engines and connectivity between the two or more processing engines defined by a programming language such as the C programming language or code and the programming language tagged with at least one directive or macro such as C preprocessor directive. The programming language and the programming language tagged with at least one directive can specify the multiprocessing system as a single monolithic C program. The processing engines can be either a software processing engine or a hardware processing engine and the programming language and the programming language tagged with at least one directive are compiled using a single processor. The software processing engine and the hardware processing engine and the connectivity therebetween can be implemented on a single silicon device such an FPGA and as defined by a single programming language using tags or macros. The connectivity can be implemented in the form of configurable uni-directional links connected between at least a portion of the plurality of processing engines. The system can also have connectivity in the form of at least one bus connecting one processing engine to another processing engine. Some or all of the processing engines can also have an interface comprising a plurality of configurable uni-directional serial links coupled to a plurality of input ports of a processing module, wherein a first portion of the plurality of configurable uni-direction serial links are from at least another processing module and a second portion of the configurable plurality of uni-directional serial links are from a bus connection and a plurality of configurable uni-directional serial links coupled to a plurality of output ports of the processing module, wherein a first portion of the plurality of configurable uni-direction serial links are coupling to at least another processing module and a second portion of the plurality of configurable uni-directional serial links are coupling to a bus connection.

One of the advantages of a system built in accordance with the present invention is the ability of a bus master (PPC or MicroBlaze, for example) to perform useful computation in parallel while multiple processing modules communicating through FSL channels or the CoreConnect bus are active. Additionally, by providing the flexibility to use CoreConnect as a communication channel, embodiments of the present invention offer all the advantages of a system built purely with a CoreConnect bus. Also, the availability of the CoreConnect bus allows easy integration of sub-systems built using just the CoreConnect bus, along with sub-systems built using the present invention. This model simplifies co-design by enabling implementation of modules in software or hardware by a simple change in tags. The FSL channel implements a dedicated data flow channel, thereby providing a "single clock delay" communication between any two data-dependent processing modules. Without the FSL communication channel, the data has to be communicated using the CoreConnect bus or other bus that consumes several clock cycles. With the "single clock delay", the architecture herein further enables the ability to provide function acceleration by providing multiple custom instructions that can feed one or more parallel sequences of input values to the function hardware and compute one or more parallel sequences of outputs for communication or other streaming applications. As a result, processing speed can increase in orders of magnitude.

The code necessary for implementing the design of the FPGA-based SoC can be in a format such as the well known hardware description language (HDL). HDL is a language used to describe the functions of an electronic circuit for documentation, simulation and/or logic synthesis. Verilog and VHSIC Hardware Description Language (VHDL) are standardized HDLs which are well known by those skilled in the art. Verilog and VHDL can be used to design electronic systems at the component, board and system level. They can facilitate the development of models at a very high level of abstraction. Other formats now known or to be discovered can also be used to represent the system model.

Figure 10:
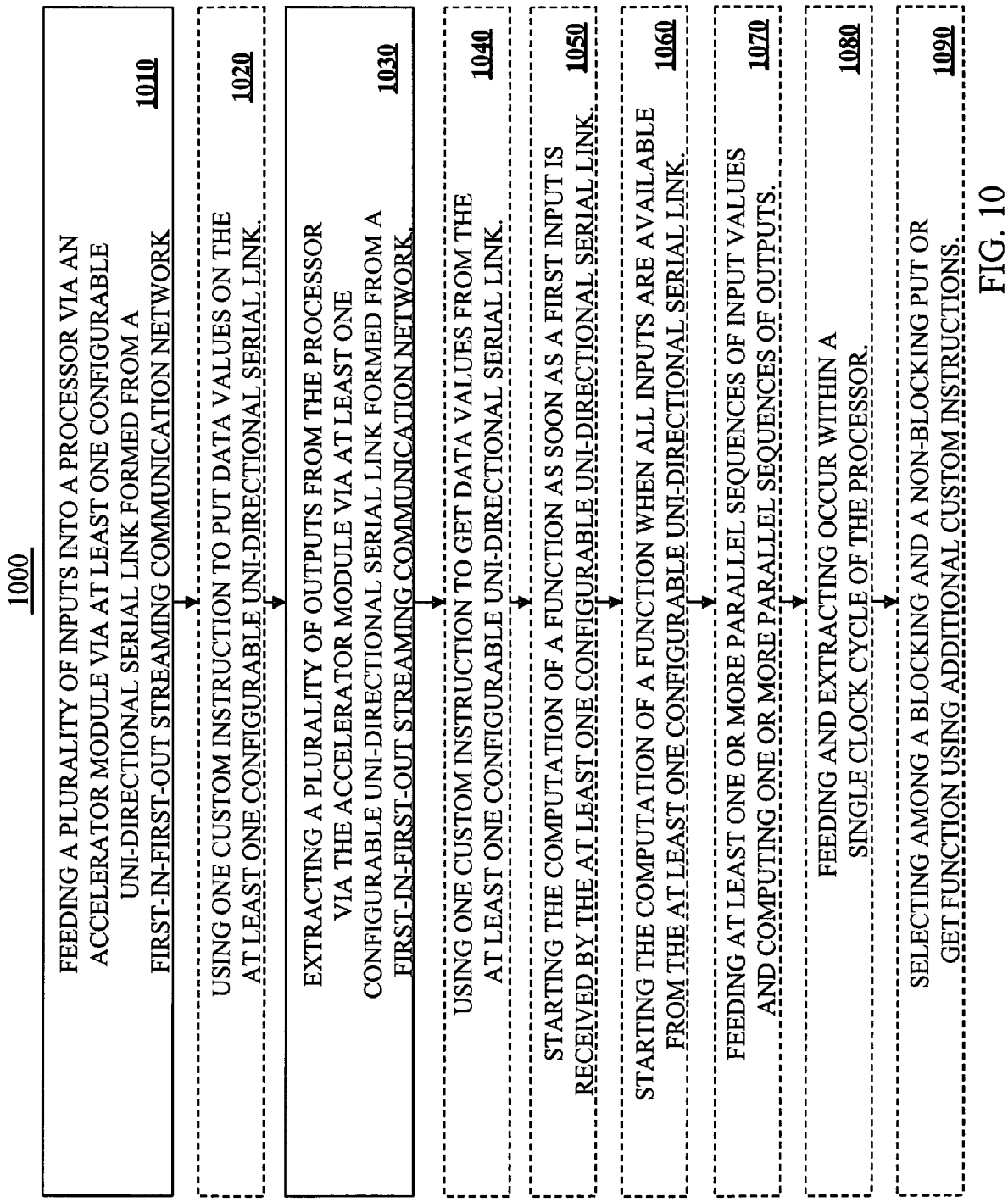
FIG. 10 is flow chart illustrating a method of accelerating functions in a processor in accordance with an embodiment of the present invention.

Referring to FIG. 10, a flow chart of a method 1000 of accelerating software functions on a field programmable gate array can include the step 1010 of feeding a plurality of inputs into a processor via an accelerator module via at least one configurable uni-directional serial link formed from a first-in-first-out streaming communication network optionally using at step 1020 one custom instruction to put data values on the at least one configurable uni-directional serial link and the step 1030 of extracting a plurality of outputs from the processor via the accelerator module via at least one configurable uni-directional serial link formed from a first-in-first-out streaming communication network once again optionally using at step 1040 one custom instruction to get data values from the at least one configurable uni-directional serial link. The remaining steps in the method 1000 are either alternative or optional steps. For example, the method 1000 can further include the step 1050 of starting the computation of a function as soon as a first input is received by the at least one configurable uni-directional serial link or the step 1060 of starting the computation of a function when all inputs are available from the at least one configurable uni-directional serial link. The method can also feed at least one or more parallel sequences of input values and computing one or more parallel sequences of outputs at step 1070. The method can also include the step 1080 of feeding and extracting data values within a single clock cycle of the processor. Optionally, the method 1000 can further include the step 1090 of selecting among a blocking and a non-blocking put or get function using additional custom instructions.

In light of the foregoing description of the invention, it should be recognised that the present invention can be realized in hardware, software, or a combination of hardware and software. A method and system for a fast linked processor network in an FPGA-based SoC according to the present invention can be realized in a centralized fashion in one computer system, or in a distributed fashion where different elements are spread across several interconnected processing modules. A typical combination of hardware and software could be a general purpose computer system with a computer program that, when being loaded and executed, controls the computer system such that it carries out the invention described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

The invention claimed is:

1. A method of accelerating software functions on a processor, comprising the steps of:
    feeding a plurality of inputs into a processor implemented on a field programmable gate array (FPGA) from an accelerator module via a first configurable uni-directional serial link (first link) formed from a first-in-first-out streaming communication network;
    wherein the accelerator module implements a function in hardware on the FPGA;
    wherein the first link is a communication channel dedicated to serial communication from the accelerator module to the processor;
    wherein a data value put by the accelerator module on the first link in one clock cycle is available for the processor to read in the immediate next clock cycle;

executing by the processor a single first instruction that reads input data from the first link;

executing by the processor a single second instruction that writes output data to a second configurable uni-directional serial link (second link) formed from a first-in-first-out streaming communication network;

wherein the second link is a communication channel dedicated to serial communication from the processor to the accelerator module;

wherein the first and second links are implemented on the FPGA;

wherein a data value written by the processor to the second link in one clock cycle is available for the accelerator module to read in the immediate next clock cycle;

extracting a plurality of outputs from the processor via the accelerator module via the second link;

wherein the step of feeding comprises a step of feeding at least two or more parallel sequences of input values and the step of extracting comprises computing two or more parallel sequences of outputs; and wherein the feeding and extracting occur within a single clock cycle of the processor.

2. The method of claim 1, wherein the method further comprises a step of starting the computation of a function as soon as a first input is input on the first link.

3. The method of claim 1, wherein the method further comprises:

feeding a plurality of inputs into the processor via a plurality of configurable unidirectional serial links (plurality of links) formed from a first-in-first-out streaming communication network using at least one custom instruction to put data values on each of the plurality of serial links; and starting the computation of a function when all inputs are available from the first link and the plurality of links.

4. The method of claim 1, wherein the method further comprises a step of selecting among a blocking and a non-blocking put function using additional custom instructions.

5. The method of claim 1, wherein the method further comprises a step of selecting among a blocking and a non-blocking get function using additional custom instructions.

* * * * *